United States Patent [19]
Leleu

[11] Patent Number: 6,088,687
[45] Date of Patent: Jul. 11, 2000

[54] BILLING PROCEDURE AND SYSTEM FOR DATA TRANSMISSION NETWORKS

[76] Inventor: Jean-Luc Leleu, 46, boulevard Richard Lenoir, 75011 Paris, France

[21] Appl. No.: 08/813,153

[22] Filed: Mar. 7, 1997

[30] Foreign Application Priority Data

Mar. 8, 1996 [FR] France .................................. 96 02930

[51] Int. Cl.⁷ .................................................. G06F 17/00
[52] U.S. Cl. .......................................... 705/400; 379/114
[58] Field of Search ............................. 765/400; 705/400, 705/52; 379/114, 115, 119; 380/51; 455/445; 370/229, 233, 234, 238, 351, 355; 709/226, 238

[56] References Cited

U.S. PATENT DOCUMENTS

| | | | |
|---|---|---|---|
| 3,870,866 | 3/1975 | Halpern ................................... | 379/144 |
| 5,351,286 | 9/1994 | Nici ........................................ | 379/115 |
| 5,481,534 | 1/1996 | Beachy et al. ......................... | 379/114 |
| 5,771,289 | 6/1998 | Kuzma ................................... | 380/23 |

OTHER PUBLICATIONS

Estrin, D., and Zhang, L., "Design Considerations for Usage Accounting and Feedback in Internetworks", *Computer Communication Review*, vol. 20, No. 5, Oct. 1990, New York, U.S., pp. 56–66.

*Primary Examiner*—Edward R. Cosimano
*Assistant Examiner*—Thomas A. Dixon
*Attorney, Agent, or Firm*—Pollock, Vande, Sande & Amernick

[57] ABSTRACT

The invention concerns a device or machine used for payment and electronic currency systems and systems for billing or payment for data transmission in the network. The device or machine can insert, within the control structure associated with a data packet in a data-transmission network, a token containing a toll unit credit, and can initiate an electronic or physical machine-executed operation after having authenticated and debited the credit associated with the token belonging to a packet. The device or machine according to the invention allows billing or payment for transmission, the content of a data packet, or the service provided with respect to the content of a data packet.

21 Claims, 4 Drawing Sheets

| NP | LENGTH | RESERVED | SAID | ID TOKEN CREATOR | T | Q | N | ETAT | VNJ | VNJ (CONTINUED) | . . . . | VNJ (END) |

FIG. 4

BILLING PROCEDURE AND SYSTEM FOR DATA TRANSMISSION NETWORKS

FIELD OF INVENTION

The invention in question relates to payment and electronic currency systems and to systems for billing or payment for data transmission within a network. More especially, the invention concerns a procedure or device making it possible to credit or debit a token incorporating a toll-unit credit in a data packet carried by a transmission network.

BACKGROUND OF THE INVENTION

Increased commercial use of the Internet network raises the problem of funding this network.

On the Internet, it is very difficult or excessively costly to apply the charge-metering principles in use:

billing based on the connection time between two terminals at a given transmission rate and over a given distance.
 billing based on the quantity of data exchanged between two terminals and on the data-transmission rate.

The Internet has no central management and users are not listed by any administrative entity, omissions resulting from the cooperative, decentralized character of this kind of continuously-expanding network.

In contradistinction to telephone or other types of data-transmission networks, such as those using the X25 protocol, the Internet employs an IP completely sessionless protocol, which carries data in data-packet form.

The two foregoing characteristics impair the ability to finance data transmission on the Internet. For this reason, the network is normally paid for by billing access only at one physical point on the network. Such billing is either effected as a lump-sum payment or is based on the quantity of data transmitted to, or received from, the entirety of the network. Furthermore, the telecommunications operators which run independent systems on the Internet must develop commercial agreement and partnership strategies in order to accept retransmission from third-party sites through their own sites. Circuit-routing strategies derive from these first strategies.

This charge-metering system does not allow fair, equitable billing of data transmission based on the path traveled and the transmission rate.

Using the current charge-metering system, data transmission from Paris to Tokyo is billed in an amount equal to transmission from Paris to Lyon. However, the path over which the data are carried in the first case requires a more extensive, more costly infrastructure for transport purposes.

Accordingly, the current charge-metering system does not take into account the exact economic cost of the data-transmission service.

In addition, this system does not allow preference to be given to some packets over others in accordance with a simple method, and, therefore, the provision of enhanced service quality or higher speed in return for higher rates of payment.

Moreover, it does not allow equitable charge-metering of certain packets requiring special, more expensive treatment for authentication, encryption, and management of the network. Nor does it allow simple billing of total access to several computers belonging to the network and capable of delivering inexpensive services. It does not permit billing similar to the "kiosk"-type billing practiced on the Minitel network.

BRIEF DESCRIPTION OF THE INVENTION

The procedure according to the invention enables each data packet carried on the network to pay for its own transmission cost, or the cost of a service or operation relating to the container or contents of a transmission packet.

The device, or system, connected to a data-transmission network can, using a numerical signature mechanism, calculate and authenticate a numerical value (toll token) corresponding to a toll-unit credit.

The device or system according to the invention can insert, in the data packets carried by the network (in general, at the time of packet transmission), a toll header containing a numerical value (toll token) corresponding to a toll-unit credit.

The device or system according to the invention can determine whether the transmitted data packets contain a payment header (normally at the time of packet reception); then, using a numerical or electronic signature mechanism, it can authenticate the numerical value of the payment token corresponding to the payment-unit credit associated with the data packet. If authentication proves to be positive, the device according to the invention can debit all or a portion of the credit linked to the value of the payment-unit credit, a procedure entailing modification of the numerical value of the token.

Depending on the type of token used, the device or system according to the invention can store a portion of the data composing the numerical value of the token corresponding to the payment-unit credit associated with a packet, in order to allow financial remuneration in exchange for these data. If the values contained in the token cannot be stored, it can credit an account belonging to the creator of the initial value of the payment-unit credit contained in a data packet. In the preceding case, the device according to the invention can, using a numerical signature mechanism (with a key which only the creator of the token has), authenticate the values of the credited accounts, in order to effect financial remuneration in return for these values.

The device or system according to the invention can, once the credit associated with the token is debited, trigger an electronic or physical operation performed on container or contents of the transmitted data packet. The term "container" here signifies the header of the packet, the start and destination addresses, and all of the other information which the network needs to transport the packet. The term "contents" signifies the data associated with these control data.

The device or system according to the invention can authenticate the numerical value of a payment token, so as to trigger an electronic or physical operation, without changing the toll-unit credit associated with the payment token.

The device or system according to the invention can calculate a value corresponding to the toll-unit credit (toll token) associated with a data packet as a function of the destination address of the packet. It can construct and use tables of correspondences between the destination addresses (or groups of destination addresses) and the number of nodes to pass through, the types of operations these nodes can perform, and the service grade of these operations. It can also calculate a numerical value constituting a toll-unit credit (toll tokens) associated with a data packet, which is a function of the number of operations than can be carried out by applying this credit, of the service grade of these operations, and of the types of operations.

The device or system according to the invention can, during the token-creation and token-modification process, authenticate the numerical value associated with the toll-unit credit (toll tokens), by implementing numerical signature mechanisms whose calculation principles derive, in part, from cryptography and the creation of certain hashing functions. It may also incorporate, within a toll token, values constituting electronic coins preliminarily stored in the memory of the data-processing system. All of the operations making use of numerical signature mechanisms to authenticate the numerical values of the payment tokens can be performed randomly or on a probabilistic basis.

The device or system according to invention can receive and transmit to other devices connected to the data-transmission network a number of sequences of codes that are machine-runnable or readable and signed numerically; furthermore, it can authenticate, modify, and construct the numerical values of the toll tokens.

The device or system according to the invention may bear a seal certifying that the device has not been modified, opened, or replaced, in order to preserve the integrity of the functions carried out by virtue of the invention.

DETAILED DESCRIPTION OF THE INVENTION

The detailed description that follows makes significant use of symbols associated with the operations carried out in data-processing systems used in telecommunications and data networks. These functional descriptions and symbols are those used by experts to convey their thoughts and work to their colleagues.

An algorithm is normally seen as an autonomous sequence of steps performed in succession in order to reach a desired result. These steps require physical manipulations of physical quantities, which generally take the form of electrical or magnetic signals, which can be stored, transferred, combined, compared, displayed, and manipulated in various ways. For ease of use, these signals are generally referred to as bits, bytes, values, elements, symbols, operations, messages, terms, numbers, fields, tokens, etc.

It must be borne in mind that all of these and comparable terms must be associated with the appropriate physical quantities and are suitable for referring to these quantities.

In the present invention, the operations referred to are performed by machines. The machines suitable for performing the operations according to the invention include standard computers or devices used in telecommunications networks to route transmitted data-packet traffic. These are referred to as "nodes" or "routers" respectively. We may even refer to a computer or electronic device dedicated to the implementation of the invention as a toll server, toll gateway, or "payer." In all cases, the reader is urged to bear in mind the distinction between, on the one hand, the operations that must be performed by the computer or data-processing system in order to guarantee implementation of the invention, and, on the other, the way in which the computer or data-processing system will function and carry out these operations. The invention describes the operations to be performed by a data-processing system connected to various telecommunications networks so as to process electric or other physical signals for the purpose of generating the desired physical signals.

The invention in question also concerns devices and systems which perform these operations. Such devices may be custom-built for this purpose, or they may consist of a standard computer that is reconfigured by a program stored in the data-processing system. The device which carries out the various steps of the process according to the invention is not a normal component of any specific computer or apparatus. A wide variety of machines can be used, provided they are configured and programmed or built in such a way that they incorporate knowledge of the invention. It is even possible to custom-build an apparatus which carries out the various steps performed by the device according to the invention. The components needed to operate this type of device will be determined by the following description.

Accordingly, the invention concerns a procedure for determining the elements to billing the cost to at least one centralized financing organization of the operations performed by a data-packet transmission network, this network comprising a multiplicity of communication nodes which carry out the operations by means of one or several operators and which serve multiple users, this invention being characterized by the fact that it consists of the following major steps involving:

a) assigning to each data packet to be transmitted by a network user a first value representing a so-called "toll" monetary unit credit, as well as the identity of the centralized financing organization supplying the credit, the credit amount corresponding to the cost of the operations to be performed on the data packet in the data-transmission network using at least one communication node;

b) recording the first representative value and the identity of the centralized financing organization concerned;

c) in at least the communication node, reducing the first representative value by an amount representing the cost of the operations to be performed on the data packet in the node in question;

d) recording the amount representative of the reduced representative value and the identity of the centralized financing organization;

e) for each user and each centralized financing organization, adding the first stored representative values in order to calculate a first total amount owed by the user to the various network operators through the centralized financing organization; and f) for each operator and each centralized financing organization, add the representative amounts stored in order to obtain a second total amount owed to the operator concerned by the various network users through the centralized financing organization.

The network user purchases from the centralized financing organization at least one toll token representing monetary units, the first representative value being debited on the toll token purchased by the user.

Operation c) further entails:

performing operations on the data packet if the representative amount is equal to or less than the representative value, refraining from performing the operations on the data packet if the representative amount is greater than the representative value.

According to another feature of the invention, at least the representative value of the monetary unit credit and the representative amount of the reduced representative value are numerical numbers resulting from the performance of authentication functions on the representative value and to the representative amount.

The authentication function is also performed on the content of the data packet and on the identity of the centralized financing organization.

The authentication functions are of the numerical signature type and are procedures employing hashing functions and cryptography procedures.

According to another invention feature, a non-duplication function is performed on the representative value of the monetary unit credit so as to prevent the use of the representative value more than once.

The representative values and representative amounts are authenticated randomly and on a probabilistic basis.

As part of the procedure, provision is made for transmitting the key belonging to the electronic signature procedure to at least one network operator, in order to enable it to code and authenticate the numerical numbers as required.

To implement the procedure described above, the data-transmission network must incorporate, at each node where operations are to be carried out, at least one data-processing system which is programmed so as to perform the various steps of the procedure. This data-processing system can be personalized as a system working independently of the data-processing system running the node, or it can be integrated into the data-processing system by adding the appropriate software.

In this description, we explain in detail a number of elements, such as the configuration and topology of the systems and networks, the representative packets and structures thereof, a number of messages, calculation steps, interfaces, etc., in order to provide better understanding of the invention. However, those skilled in the art will clearly see that the invention can be produced even when none of these details is supplied. Furthermore, the circuits, electronic components and architectures now used and conventionally known to the specialists are not explained in detail, so as not to obscure the invention description. In addition, a number of words, such as "know," "verify," "examine," "use," "find," "understand," "determine," "bring about," "authenticate," etc., are used in these specifications and are held to be terms of art. The use of these terms, which refer to the various functions of the system and which the uninitiated might consider as the personification of the computer or of the electronic system, actually serve to simplify the description.

For example, when reference is made to an electronic system, the word "determine" as applied to a value, merely represents a faster way of explaining that the system has been programmed or built in such a way that this operation can be performed.

Accordingly, the reader is urged not to confuse the functions described herein with the attributes or characteristics of a human being. The term "function" here denotes an operation carried out by a machine.

Figure 1:
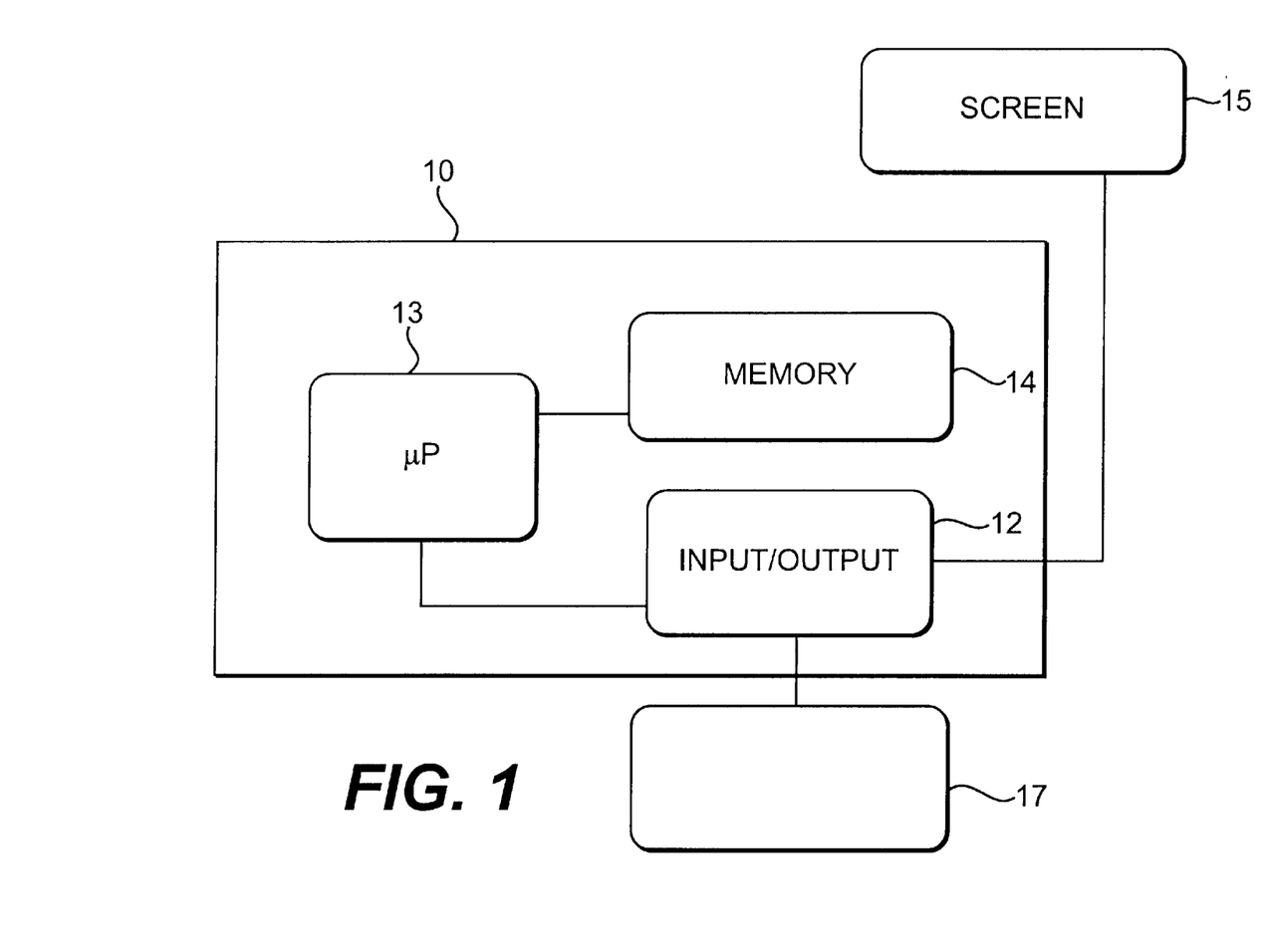
FIG. 1 illustrates the electronic support facilities for the data-processing system in which the invention is implemented.

FIG. 1 illustrates a data-processing system made requisite by the invention. We will describe a computer 10 comprising three main components. The first is an input-output circuit (E/S) 12 which is used to transmit information in an appropriate form and is configured among the various components of the computer 10. The computer also incorporates a processor 13 (for example, a μP microprocessor) connected to the input-output circuit (E/S) 12 and to a memory (MEM) 14. These components, which are very frequently built into standard computers, are supposed to be representative of a broad category of data-processing machines. We also illustrate an interface circuit 17 connected to the E/S circuit 12 so as to connect the computer 10 to a network, as required by the invention. A display monitor 16 is also connected to the E/S circuit 12, on which the display is generated by the processor 13 (for example a μP) in accordance with the invention. Any widely-used cathode ray tube or other type of screen can be used as the monitor 16. It should be noted that use may be made of an off-site screen or that of another machine connected to this data-processing system by means of the network.

A stand-alone system SAS consists of a series of routers or networks under a single operating authority. The stand-alone system considered here is of the type belonging to suppliers or telecommunications operators, and sometimes to universities or manufacturers. This type of SAS, which provides retransmission service, is a network comprising a series of infrastructures designed to transmit data. One could say that the Internet network is formed by a series of interconnected stand-alone systems. These systems divide up the data traffic on the Internet among them by implementing routing strategies on the periphery of their network.

Figure 2:
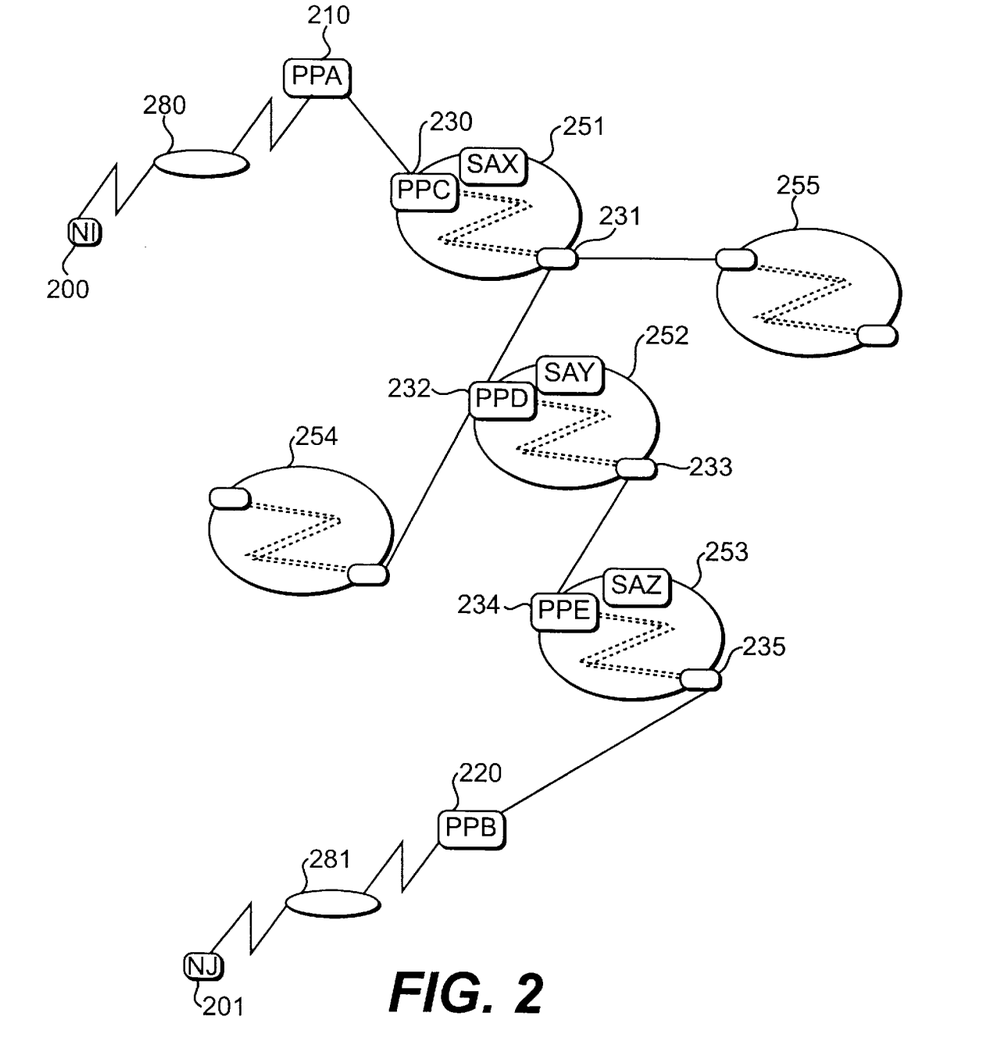
FIG. 2 illustrates one possible network topology in which we can describe how the invention functions in an Internet environment.

FIG. 2 is a simplified diagram illustrating conceptually the topology of an Internet network. The diagram shows an "external" (to the Internet) network 280 connected by the link 210 (PPA) to the Internet. A subunit of the Internet is shown here by the connection joining five stand-alone systems 251 (SAX), 252 (SAY), 253 (SAZ), 254, and 255. The networks 254 and 255 are represented only to show that each stand-alone system may be connected to several other stand-alone systems. A second "external" network 281 is connected to the Internet by 220 (PPB). The two external networks 280 and 281 may be:

a local private network working with the IP protocol, as on the Internet; or a public or private network functioning with a protocol other than IP, such as X25, RNIS, etc.; or a public or private telephone switching network.

The three stand-alone systems termed SAX, SAY, and SAY then make it possible to implement the path of a data packet within the Internet. It should be pointed out, however, that the invention can be used in networks other than the Internet.

One of the unique features of the Internet system lies in the fact that messages and data are transmitted via datagrams data packets. In a network based on datagram transmission, messages are sent from a point of origin to a destination in the same way that a letter is sent through the mail. For example, an originating computer sends a datagram to a destination computer without knowing whether it is connected to the network at the time the packet is dispatched. The IP protocol is a completely sessionless protocol. There is no virtual connection or path between the source computer and the destination computer. No one IP datagram is associated with any other datagram.

In these specifications, the invention is described with reference to transmissions between nodes, links or access nodes, and routers. For example, the node 200 NI connected to network 280 is connected to the Internet by the gateway 210 (PPA). The node 201, which is connected to network 281, is connected to the Internet over the access node 220 (PPB). Nodes NI, NJ, the gateways PPA, PPB, etc., represent data-processing systems comparable to that illustrated in FIG. 1, which are connected to their respective networks. For the sake of simplicity and ease of understanding, an operation performed utilizing the node NI or the gateway PPA, for example, must be understood as an operation performed utilizing the computer connected to the network 280. The invention may be produced either in the node itself or in a device connected to the node and similar to the system described in FIG. 1. This device may be either a standard computer or a specially-designed system optimized in order to execute the functions specified in the invention. To promote understanding and for the purpose of simplification, an operation utilizing a node belonging to the network must be understood to be an operation utilizing a node of the network in order to implement the invention, either by virtue of having implemented the invention in the node itself or by connecting this node to a second node or device, such as that described in FIG. 1.

We shall now consider, in FIG. 2, the path travelled by a "datagram" data packet sent by a computer 200 or node NI belonging to the network to a computer 201 or node NJ. In this configuration, this packet travels through three stand-alone systems SAX, SAY, and SAZ.

It should be noted that the path taken by the packet and the number of stand-alone systems traveled are variable and do not depend on the physical distance between the two computers NI 200 and NJ 201, nor on the physical location thereof, but rather on the commercial and cooperative agreements signed by the various telecommunications operators and administrators of public or private stand-alone systems. These agreements determine the configurations of the gateways or nodes providing access to these stand-alone systems. These configurations are set up for traffic-routing protocols such as EGP, BGP-4 (Border Gateway Protocol 4), etc.

The path taken by this datagram will be the arc 200, 210, 230, 231, 232, 233, 234, 235, 220, and 201. The notion of a node giving access to the network or of a node providing output from a network depends on the direction of travel of the packet: the source is node I, the destination node J. Obviously, if the direction is reversed, the output node becomes an access node, and vice-versa.

The node 210 PPA will become the node providing access to the Internet; that is, the gateway computer belonging to the Internet Service Provider.

The computer 230 (PPC) will be a node giving access to the stand-alone system 251 (SAX), and the computer 231 will be the node providing output from 251 (SAX).

The computer 232 (PPD) will be a node giving access to the stand-alone system 252 (SAY), and computer 233 will be a node providing output from 252 (SAY).

The computer 234 (PPE) will be a node accessing the stand-alone system 253 (SAZ), and computer 235 will be the node providing output from 253 (SAZ).

The node 220 (PPB) will be the node providing output from the Internet network for a packet sent by 200 (NI) to 201 (NJ). This node 220 (PPB) will be the gateway belonging to an Internet Service Provider and will be connected to network 281.

The topology of the network described in FIG. 2 is representative of an Internet topology. It should be noted that the invention can be implemented with other network topologies and in networks other than the Internet, and by using protocols other than IP.

We will now explain the idea of "toll token," which is here presented in the context of the invention.

A toll token is a numerical value associated with a toll unit credit; that is, a bit sequence or string of n bits (when n is the number of bits in the string), which may represent:

a value which can be exchanged for real currency (e.g., francs, dollars, yen, etc.), a value which may, at any time, authorize an electronic system to perform an operation, a value which can be recorded by an electronic system, or a value that can be modified by an electronic system in return for the initiation of a physical or electronic operation.

A toll token may be:

sold in return for real currency, exchanged or used for a given service or electronic or physical operation.

A toll token consists of physical, electric, or magnetic signals that can be handled by an electronic system.

To more effectively describe the way in which the invention functions, we introduce two types of values to make reference to a token J: the numerical value VNJ, or the real value of the token, the value corresponding to its representation as physical or electronic signals; and the idea of compensation value VCJ. The compensation value of the token is the exchange value thereof or the credit associated with the token. For example, the monetary compensation value will be given in units of currency. For example, 1,000 tokens are worth 1 franc. The exchange value for the purposes of transmission of a packet corresponds to a transport credit. For example, a datagram may contain a token whose transmission credit depends on the number of network nodes through which it can travel.

The compensation value or credit of the token may depend on the number, type, and grade of the operations the token may potentially initiate. If T is the type of operation, Q the service grade of the operation, and N the number of operations, then $VCJ=V_{TQ}(N)$. For example, initiated T-type operations may include the authorization to allow a datagram to enter a node belonging to the network, N may be the maximum number of nodes through which the datagram can travel using a token, and Q may be a priority level assigned to a datagram.

We shall call expenditure of the token J the change of its numerical value, and thus of the associated compensation value thereof following initiation of any operation whatever.

For example, when a datagram containing a token J travels through a node, if $VCJ_n=V_{TQ}(n)$ is the compensation value of the token J having numerical value $VNJ_n$ prior to travel through a network node, then $VCJ_{n-1}=V_{TQ}(n-1)$ is the compensation value of the token associated with the numerical value $VNJ_{n-1}$ after it has traveled through the node.

In accordance with the invention, a token is inserted in the control structure, that is, in the header of a data packet. This packet will be able to finance various types of operations by itself, such as the transmission of data contained in this packed through the different nodes belonging to a network. It may also finance the encryption and decryption of the data contained in the packet, or it may allow execution of the machine-runnable or machine-readable code of a program or portion of a program contained in this packet. The token contained in a data packet may finance any type of operation at any node of the network in which the packet will reside, including the packet-origination and packet-termination nodes.

Before describing the main functions of the invention and the methods this invention can employ to construct a toll token J, two types of tokens must be distinguished: storage toll tokens JS and volatile toll tokens JV.

The first tokens possess a compensation value which remains valid during a limited time period. This period may range from several hours to several years. The second possess compensation value solely during packet transmission, a time period which may not, in general, exceed several seconds.

Two major functions executed in accordance with the invention include:

The crediting function at the time of packet transmission:
retrieval of the values needed for construction of the token;
creation of the token J based on the values of T, Q, N, or other values (calculation of VNJ);
insertion of the toll token in the datagram to be sent.

The debiting function at the time of reception of the packet:
verification of the token, presence, and authentication;
expenditure of the toll token belonging to the packet received (modification of VNJ, the numerical value of the token);
retrieval or transformation of the tokens for exchange or reimbursement;
crediting reimbursement to an account;
initiation of the electronic or physical operation.

The neutral function (neither crediting nor debiting):
a function which, depending on certain circumstances, may leave the token as is without modifying it. In this case, the toll token comprises simply an authentication value authorizing initiation of an electronic or physical operation, e.g., travel through nodes without debiting the token.

In the following part of the text, the terms "debit," "credit," and "neutral" nodes signify nodes belonging to the network which execute the crediting or debiting functions according to the invention. It should be noted that each node may be a debit or credit node simultaneously with respect to different packets and, potentially, to the same packets.

We will now describe the implementation of the invention used to finance data transmission within the topology described in FIG. 2.

In FIG. 2, when a packet travels from NI to NJ, the credit node is either the node NI itself or the node PPA. The nodes PPC, PPD, PPE, PPB, and NJ may be debit nodes. Generally speaking, the transmitting node or the node belonging to the Internet Service Provider may be credit nodes, and the other nodes through which the packet travels may be debit nodes. Transmission of packets originating at node NI may entail several possible financing modes. It is possible to purchase storage tokens to be inserted in packets transmitted from the node NI; values will be selected based on the destination address of the packet for which transmission is being paid. Another possibility involves insertion of the storage or volatile tokens at the node PPA belonging to the Internet Service Provider.

Figure 3:
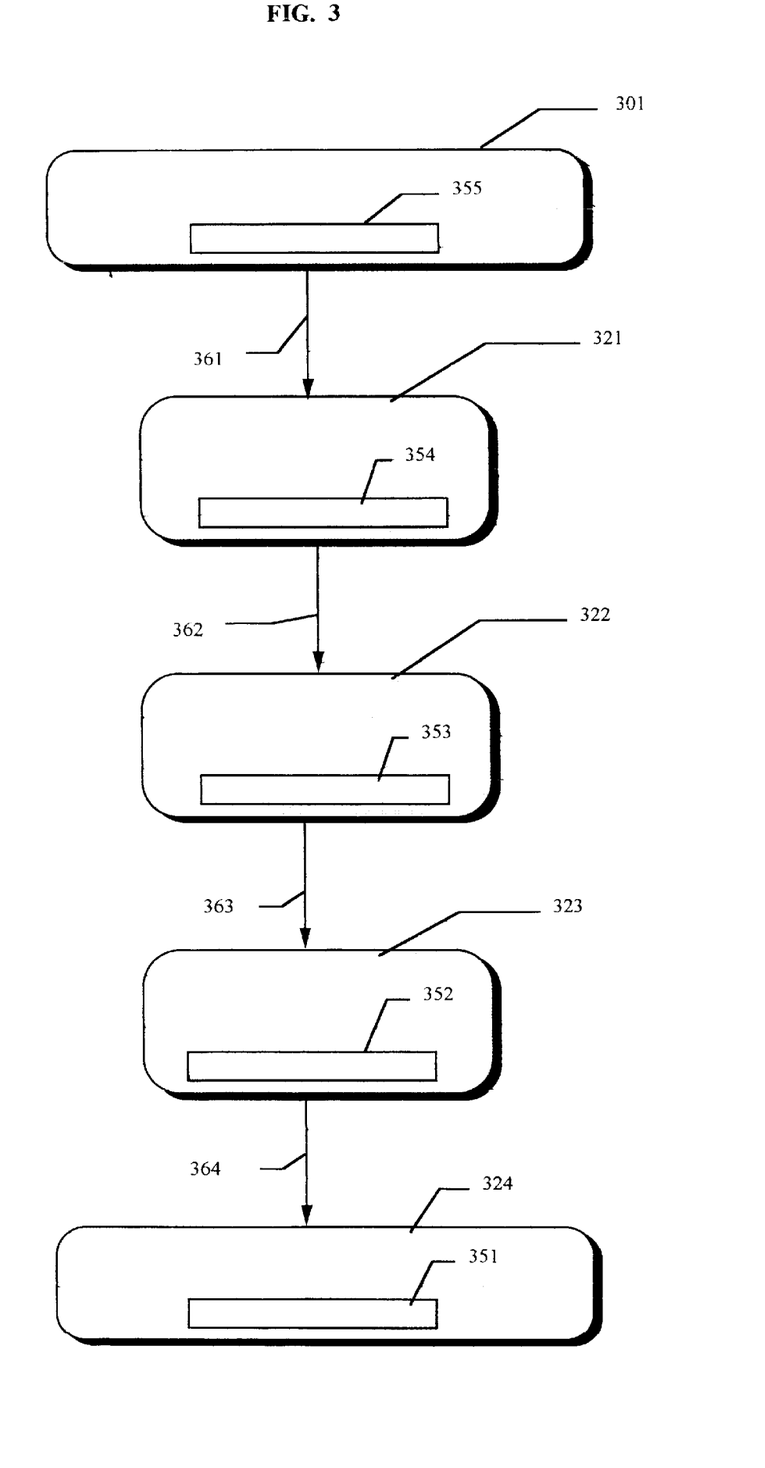
FIG. 3 illustrates the modifications of the content of a field used in the invention, this field being one element of the control structure of a data packet.

FIG. 3 illustrates a variation of the value VCJ associated with the packet after traveling through the nodes PPA 361, PPC 362, PPD 363, and PPB 364, 301, 321, 322, 323, 324 represent the same data packet to which different values VNJ 355, 354, 353, 352, and 351 are attached.

To insert a toll token in a data packet, a toll header must be defined in order to allow processing of the token-carrying packets. This header must precede the data composing the tokens. It may, for example, consist of several fields, such as the length of the data composing the token or tokens, the field containing an ID of the creator of the token which will allow processing of the numerical value of the token VNJ.

Figure 4:
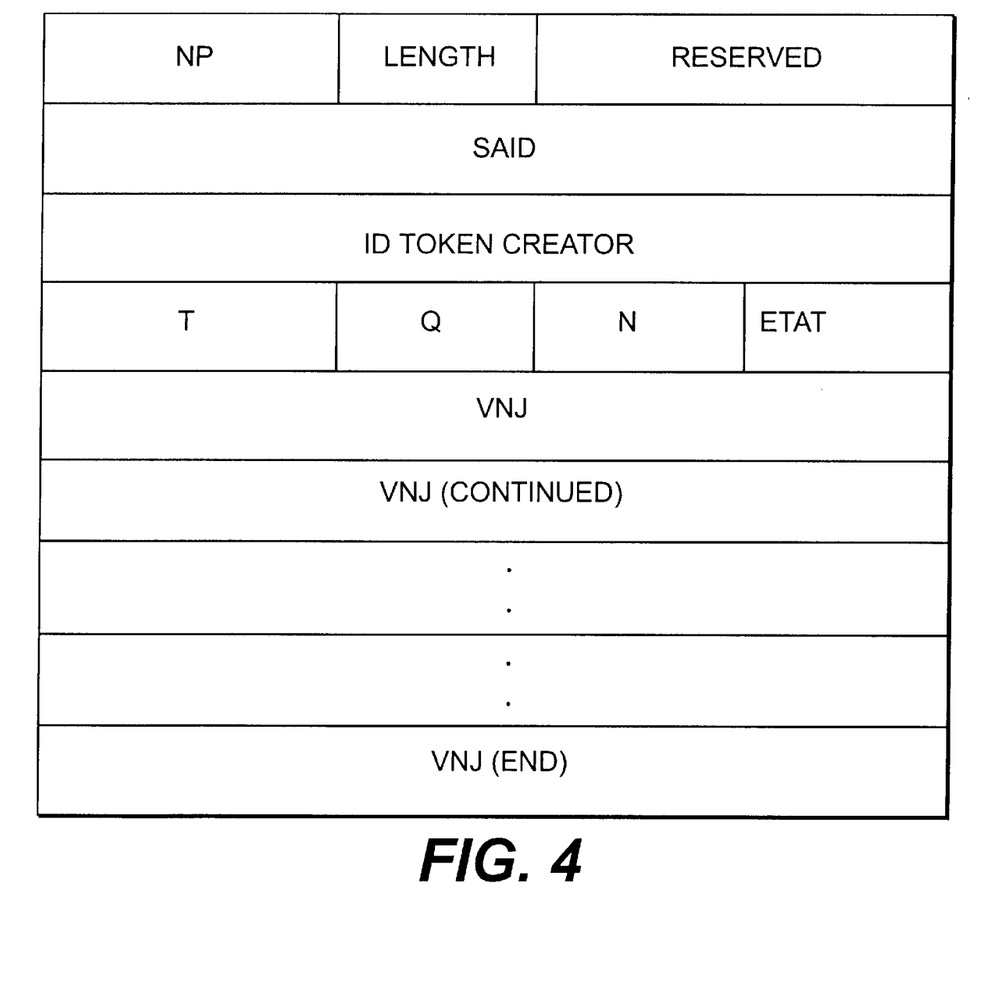
FIG. 4 illustrates a possible header model for the toll structure.

FIG. 4 provides an example of a toll header usable in accordance with the invention. As in the safety header Ipv6, one line may correspond to a 64-bit sequence. The field ETAT ("STATE") may furnish a specific state of the token allowing travel through the node, using the neutral function of the invention, that is, neither a credit or debit function, but simply a value VNJ authorizing travel through the node.

In IPv4 packets traveling on the Internet, this header and the related data may be integrated using the option field of the IP packets, for example by defining a new, non-used type of option. As regards IPv6, the incorporation of a toll header in the IETF could be proposed. This header would be comparable for certain fields in the IPv6 or IPng security header, and the current security header could even be used.

We will now describe the way in which the invention retrieves the data needed to construct the token. To implement the invention, it is not necessary to use a complete protocol allowing interrogation of any possible debiting or crediting nodes. The invention obtains the number of debit nodes and the types of debits it performs on a token. The credit node may update a table indicating the number of debit nodes to pass through, depending on the destination address. This table may be of the same type as a routing table on a router. The type of operation, the service grade, and the number of nodes can be combined for each address or group of addresses. To update this table, the crediting portion of the invention will, accordingly, fill in the first packet to be sent to its destination with a token having a maximum compensation value for all types of services provided and a maximum number of nodes.

The final debit node must send back an error if a packet arrives with a token containing more credit that it can debit. For example: a token has the numerical value VNJ4 (the indicator 4 represents the number of nodes through which the packet may travel), the node which receives it debits the token, and the token then has a value $VNJ_3$. In this instance, the debit node returns the token to the last credit node transmitting the packet. It is here understood that there may be several credit nodes along the path of an IP packet, for example. Upon reception of an error packet, the table mentioned above is updated at the transmitting credit node. The packets transmitted are stored for a fairly short period in a cache allowing inspection of the error packets. Quite obviously, this very simple method could be improved. It is presented here to show the feasibility of the invention. Thus, we could conceive of a protocol according to which the debit nodes would be interrogated by the credit nodes, which would operate in accordance with the same principles as a routing protocol, for example; alternatively, the structure of the aforementioned tables could be integrated into a routing protocol.

The packets used to update these tables may be provided with tokens allowing travel through the nodes without debiting or crediting the token (token having a numerical authentication value), thereby implementing a neutral function according to the invention.

The invention may also include, in the toll header, information concerning packet routing, since the path to be followed by the packet may depend on the choice of the debit nodes through which travel is to occur.

The numerical value VNJ and the point of origin of the toll token J must be verifiable and subject to authentication. This numerical value may be authenticated using a numerical signature mechanism. If D is a sequence of numerical data D and D' the signature of D, this numerical signature may be obtained by effecting various operations, including:

operations utilizing a private or secret key SK and a public key PK (such as that used for RSA or Diffie-Hellman), such that $D'=S_{SK}(D)$, while D' is verified by checking to ensure that $S_{PK}(D)=S_{PK}(S_{SK}(D))=D$.

a secret hashing function $h_S$ such that, if D is a string of n bits and D' a string of m bits, $h_S(D)=D'$. Only the possessor of the function $h_S$ can produce and authenticate these data. This method is less reliable and leads to encrypted transmission of the function $h_S$, but it is much faster. A hashing function is executed 100 times faster than the verification of an RSA signature, and approximately 10,000 times faster than the generation of an RSA signature.

We now discuss various techniques for creating a token J having a value VNJ. Depending on the techniques used, token creation, expenditure, retrieval, exchange, or reimbursement are faster or slower, but also more or less reliable and resistant as regards cryptography.

The method must be suited to the type of operation, so as to ensure that the billing cost does not exceed the cost of the operation itself. For example, when transmitting IP datagrams, the systematic creation of an RSA signature for each packet is not feasible at present. Preference is currently given to a system based on a function of the same type as $h_s$. One can also purchase micro-currency from a broker and incorporate it into the toll token.

We now describe the MicroMint system employed in conjunction with the first token-construction method. In a publication dated Jan. 26, 1996, Ronald L. Rivest and Adi Shamir describe two micro-payments systems: PayWord and MicroMint.

They demonstrate that, using MicroMint, "electronic coins" of minimal value can be produced at very low cost when the quantities thereof are large. These coins may be purchased or sold to a broker, who produces them on an industrial scale. These "electronic coins" are bit strings whose validity can be checked by anyone, but which are difficult to make. In this system, the coins are represented by hashing function collisions. One k-collision $(x_1, x_2, \ldots x_k)$ represents one coin, and this coin can be verified by checking to ensure that:

$$h(x_1)=h(x_2)\ldots=h(x_k).$$

In their article describing MicroMint, the authors state that, when mass-produced, each coin be composed of a sequence of 18 bytes. We can refer to a MicroMint coin using M (numerical value of the byte string) having a compensation value m (for example, a value of $\frac{1}{1,000}$ franc) and a length of $l=18$ bytes. It should be noted that this value of 1 is used to demonstrate the feasibility of using MicroMint or another system of the same type as part of the invention, and that 1 is a function of the parameters for constructing M and thus may change. This system also allows production of coins of different values. We refer, therefore, to a coin I (numerical value of the byte string) having a compensation value of $10*m$ (read 10 multiplied by m) and a length $l'=20$ bytes.

In a first technique allowing construction of a toll token J, several sequences having a value M are strung together. For example, if $VCJ_{TQ}=V_{TQ}(N)$, N being the number of debit nodes through which the packet travels, the value $VNJ_N$ of J will be $M_1, M_2, \ldots M_N$, and the token will have a length of $N*18$ bytes. We point out that, in this case, the token is a storage token, since it is valid for one month, i.e., the period of validity of MicroMint coins.

It is potentially possible to compress this value and to re-expand it when the token is spent. To simplify the description, compression is not used.

Within the scope of the invention, it is possible to construct a token using coins of different denominations for different service grades and different types of operations. For example, if $VCJ_{N2N1}=V_{T1Q1,T2Q2}(N2N1)$, then the numerical value $VNJ_{N1,N2}=I_1I_2\ldots I_{N2}M_1M_2\ldots M_{N1}$. The value $VNJ_{N1,N2}$ will be a token having the length $N2*20+N1*18$ bytes. In this example, we suppose that the service grade Q1 for the type of service or operation T1 is associated with the transmission of a data packet having a priority higher than the priority assigned to processing a normal datagram not incorporating a token. The packets can be processed in a routing or access node on a priority basis, depending on the service grade thereof. Type T2 is service grade Q2 associated with a different type of operation, for example, execution of all or a part of a specific code segment at the debit node.

For example, it would be possible to bill execution of the machine-readable code of the Java language contained in packets on a machine incorporating the invention.

The debiting portion of the invention could allow, or not allow, execution of the code only if each packet containing a portion of the code is properly credited with the requisite value.

We now consider expenditure of a token when it travels through a debit node, when the indicator n is the number of remaining nodes through which the packet is routed:

If $VNJ_n=M_1M_2\ldots M_n$ is the numerical value of the token before it travels through a debit node belonging to the network, and J is a string of $n*18$ bytes, then $VNJ_{n-1}=M_1M_2\ldots M_{n-1}$, and J has become a string of $(n-1)*18$ bytes.

If the invention utilizes MicroMint-type coins to construct a token J, it will produce the following VNJ changes during travel along the path of the arc 200, 210, 230, 232, 233, 234, 235, 220, and 201 in FIG. 2.

We now describe the case in which the user himself constructs the tokens. In this instance, node NI200 is the credit node and, if N1 is the number of debit nodes during transmission, then N=5.

We suppose, for the purposes of the example, that the access node PPA is the credit node and that the terminal node is a server which supplies a service or allows initiation of a T2-type operation and has a different service grade Q2. The terminal node NJ 201 is then also a debit node for a service grade Q2 and a type T2. The operation thus initiated in this case is not an operation allowing data transport. It is possible to bill an access to a data-base or the execution of any program or service whatever.

In this case, the invention assesses the cost assigned to the transport of the packet at the credit node PPA, and then the cost of the remote service. The invention calculates N1=4 and N2=1, while the present invention constructs the token J as a string of $1*20+4*18$ bytes and having a value $VNJ_{1,4}=I_1M_1M_2M_3M_4$.

The crediting portion of the invention constructs its tokens from coins Mi purchased from a broker who produces and stores large quantities of them.

If $VNJ_{1,4}$ is the value of the taken in a credit node PPA 230, then, after traveling through the first debit node PPC, J will equal $VNJ_{1,3}=I_1M_1M_2M_3$.

The debiting portion of the invention in the node PPC first checks the validity of $M_4$ before allowing the packet to proceed. This checking procedure can be effected randomly or on a probabilistic basis in order to reduce the load on the machine (this remark applies generally to the invention, since all verifications of data validity can be made probabilistically or randomly). The invention implemented at the node PPC will store the string $M_4$ if it is valid, in order to send it back to the broker for payment. It should be noted that the origin of the coin and the identification of the broker are given in the toll header of the packet. The debiting portion of the invention stores its coins based on their source, in order to facilitate the exchange thereof by the broker. These coins may, for example, be returned to the broker every evening for reimbursement.

Then, the different values of VNJ will be:

$VNJ_{1,2}=I_1M_1M_2$ after passage through the node PPD, which will store the coin $M_3$.

$VNJ_{1,1}=I_1M_1$ after passage through the node PPE, which will store the coin $M_2$ $VNJ_{1,0}=I_1$, after passage through the node PPB, which will store the coin $M_1$.

Passage through the final node PPB, which is a node providing access to the Internet for NJ, is, in this case, also a debit node, since it allows access to the network 281 incorporating NJ.

This is a method for billing access to nodes supplying specific services in the same way as the France Telecom access gateways with respect to the Kiosk service, where billing is the same for providing access to all of the servers.

Finally, the final debit node will be NJ, which will bill its T2-type service; it stores the coin $I_1$ in order to transmit it to the broker for payment.

We now discuss a second method for constructing the token J.

We will consider a secret hashing function H, which must be cryptographically resistant; that is, it must resist attacks. This function may be of the same type as an MD5 or SHA function. The principle underlying H states that it be applied to a packet or portion of a packet, and that the values T, Q, N associated with the compensation value of a token be dispersed in the result of the function.

It must be pointed out that, in the present invention, all of the hashing functions must be performed on the stationary parts of the header belonging to a packet. For example, values such as TTL (Time to Live) may undergo modifications in nodes other than the nodes utilizing the invention.

To create a token we will use the HC function.

$VNJ_{P,N}=HC_{T,Q}(P,N)P$ represents a string of m bits associated with the IP packet or with a subunit (beginning and secret ending bit). The principle consists in being able to verify the value $VNJ_n$ by calculating the value of $VNJ_{n-1}$ using a function $H_{T,Q}(P, VNJ_{P,n})=VNJ_{P,n-1}$.

Implementation of this function in a machine code (for example signed with RSA) could be downloaded on debit nodes so as to be executed by the debiting portion of the invention, in the event the H function is repeated.

It should be noted that, according to the invention, the electronic systems making up the credit, and especially the debit, nodes must, in some cases be sealed in order to preserve the integrity of the electronic system. For example, care must be taken not to modify the system, thereby impairing normal operation of the invention and allowing fraudulent use thereof (e.g., debiting tokens by a value greater than the value as established and authorized). To avoid this and other types of misuse, systems for checking token integrity can be installed in all nodes to verify that each node is working properly.

When it accepts a packet $P_i$ and spends the token $J_i$ having the value $VNJ_n$, the debiting portion of the invention can change in increments an account $C_{id}$ by the value $VCJ_n - VCJ_{n-1}$.

The indicator "id" corresponds to the descriptor of the user or user organization of the crediting part, which creates the token according to the invention. This value corresponds to the field ID CREATOR OF THE TOKEN in FIG. 4. The account $C_{id}$ is associated with the token creator or provider.

The value of the token (for example, at the end of the day) can be paid by a broker or the user of the crediting portion of the invention, which created the tokens. The value $VC_{id}$ represents the sum of all expenditures made at the node and corresponding to a credit node or a series of credit nodes. The identification of a credit node may be associated with a single node for a user, or with a series of nodes for an organization. The users and organizations using the credit node according to the invention thus promise the pay the debit amount as recorded, which results from the transit of their packets over the debit nodes, to the users of the debiting portion of the invention. A public key PK allows verification of the debit amount $Vc_{id}$ by checking to ensure that $S_{PK}(VA_{id})=VC_{id}$.

To authenticate this value $Vc_{id}$, the debiting portion of the invention will sign this $Vc_{id}$ with a secret key SK. The VCid signature is, therefore, $Va_{id}=S_{sk}(VCid)$.

To carry out another token-creation method, we now introduce the intermediate support value VSJ required for the creation of the final numerical value VNJ of the token J. This value will serve as a container of the data belonging to the token; it is VSJ which will make it possible to authenticate the transmission credit associated with the token.

The support value VSJ of the toll token can be obtained by numerically signing another numerical value VNU, whose unicity must be guaranteed. If S is a function of the numerical signature, then $VSJ=S_{SK}(VNU)$.

VNU may be either:

$VNU_S$, a serial number which is stored in order to verify its unicity; or $VNU_D$, a value obtained by performing an Fh function (termed a hashing function) on a sequence of numerical data D (for example, an IP datagram or a portion of this datagram).

The Fh function must be able to generate a single VNU value for each sequence D, such that if D and D' are numerical sequences, then the property $D \neq D' \rightarrow Fh(D) \neq Fh(D')$ is true. The value obtained in this case is called a "message digest" or "fingerprint" (literal translation from the French of "message condensé" and "empreinte digitale").

The numerical signature of this value can be produced using encryption and authentication methods, such as DES, RSA, NIST, etc., and with hashing functions such as MD2, MD4, MD5, etc.

To describe the invention, we select RSA, which utilizes a method based on public and private keys. In addition to being effective, this method allows easier reduction by decrements of the value of the transmission credit assigned to the tokens. However, the RSA method is not tied to the invention, and another method could be chosen to produce the invention.

According to the invention, the distinction can be made between the two types of toll tokens, i.e, the storage toll tokens JS and the volatile toll tokens JV. In this case, we designate as storage tokens JS those tokens whose numerical support value $VSJ_S$ is the signature of a serial number, $VSJ_S=S(VNU_S)$. In this case, we can designate as volatile tokens those tokens whose numerical support value $VSJ_D$ is the signature of the fingerprint of a data sequence $VSJ_D=S(VNU_D)$.

The composition of the final numerical value VNJ may thus be a function of the type, the grade Q, and the number N of the operations this token J is to initiate, $VNJ_N=Vn(VSJ, N, Q)$.

If we consider, for example, the prime numbers 3, 5, 7, 11, 13, 17, etc., we can assign each of them to a different service grade Q. If N is the potential number of operations, we can construct storage or volatile toll tokens whose value will depend on the values N and Q. When, for example, $VNJ^N = VSJ^{1/(Q^\wedge N)}$, if $Q=5$ and $N=6$, then $VNJ_6 = VSJ^{1/(5^\wedge 6)}$. This equality reads as follows: the numerical value $VNJ_6$ equals the numerical value VSJ raised to the power of the inverse of 5 raised to the power of 6. It is also possible to have a token such that its numerical value is:

$VNJ_{2,3} = VSJ^{1/(3^\wedge 2 \times 7^\wedge 3)} = VNJ_{N1,N2} = VSJ^{1/(Q1^\wedge N1 \times Q2^\wedge N2)}$.

This token will make it possible to perform two operations with service grade 3, and three operations with service grade seven.

If the value VNJ is composed as above, the expenditure of the token resulting from execution of an electronic operation will occur by raising the token to the power associated with the service grade of the operation. For example, if the token $VNJ_{2,3} = VSJ^{1/(3^\wedge 2 \times 7^\wedge 3)}$ carries out an operation having service grade 7, it will, consequently be worth $VNJ_{2,2} = VSJ^{1/(3^\wedge 2 \times 7^\wedge 3)} = VSJ^{1/(3^\wedge 2 \times 7^\wedge 2)}$ after having authorized initiation of this operation.

Only the idea of expenditure of the token is tied directly to the invention. Other mechanisms or methods can be used to make this expenditure. The method selected here simply allows the description of another mechanism for carrying out and describing the operation of the invention.

The invention can be used in a network topology different from that illustrated in FIG. 2, for example in conjunction with the use of a mobile node connected to the network, or by using the DHCP protocol, which assigns a volatile IP address, or again, by encapsulating the IP protocol in a protocol such as SLIP, PPP, X25, ATM, or even in IP (tunneling IP).

These differences have no effect on the operation of the invention. However, there are cases in which the functioning of the invention may be disrupted, for example when packets undergo fragmentation. To prevent these packets from spending their token, the debiting portion of the invention must be prohibited from spending a token in a fragmented packet. It is a simple matter to verify that a packet is a fragment or not, no matter what the protocol employed. Furthermore, fragmentation is highly limited (if not virtually prohibited on the WAN parts of the network) in the new version of the IP protocol, i.e., Ipv6. In addition, if the invention makes use of MicroMint-type coins whose value does not depend on the value of the packet, attempts to reimburse a copy of a coin previously received by the broker necessarily fails (according to the description provided by the creators of MicroMint). In another case, if we construct tokens based on carrying out a hashing function on the packet, it is easy to verify whether the packet has been modified but not the token, in particular by examining the header fields of the fragmented packet.

Control functions may be added to the invention, thereby preventing packets from traveling several times through the same node. The invention may preserve, in "cache" tables, certain data specific to the packets or tokens that have already traveled through the node. The invention may compare the data from the processed packet or token with the data it has placed in its cache. These operations may be carried out on a probabilistic basis.

The invention has been described with reference to several examples, which do not limit variations and the various ways of producing the invention. Obviously, modifications and improvements may be introduced without altering the spirit and essential nature of the invention content.

The invention mainly allows charge metering of data transmission on a data-transmission network and, in particular, on a cooperative-type network lacking centralized administration, that is, a network comparable to the Internet. The invention may also constitute an electronic payment mechanism linked to the content of the packets in the nodes belonging to a data-transmission network.

The system according to the invention allows each data packet carried by the network to pay for its own transmission cost.

In addition to the information required for control by the network, each packet contains additional information corresponding to a toll unit credit. One portion of this credit is deducted at each step of the routing path of the packet at its point of destination. During the entire route of the packet, each public or private telecommunications operator involved in packet transmission may deduct a portion of this credit. In this way, the operator is paid directly for the service provided in order to transmit these data.

This packet will itself finance various types of operations other than transmission. It may also finance encryption and decryption of the data contained in the packet, or allow execution of the machine-runnable or machine-readable code of a program or portion of a program contained in this packet. The token contained in a data packet may finance any type of operation or service at any node belonging to the network in which the packet will reside, including the originating and terminal nodes.

The invention just described with respect to FIGS. 1 to 4 concerns, more especially, a procedure for determining the billing components of the cost, at at least one centralized financing organization, of the operations performed by a network used for transmission of data in packets, this network comprising a plurality of communication nodes performing the operations by means of one or multiple operations and serving multiple users, this procedure being characterized by the fact that it includes the following main steps:

a) assigning to each data packet to be transmitted by a network user a first value representing a so-called "toll" monetary unit credit, as well as the identity of the centralized financing organization supplying the credit, the credit amount corresponding to the cost of the operations to be performed on the data packet in the data-transmission network using at least one communication node;

b) recording the first representative value and the identity of the centralized financing organization concerned;

c) in at least the communication node, reducing the first representative value by an amount representing the the cost of the operations to be performed on the data packet in the node in question;

d) recording the amount representative of the reduced representative value and the identity of the centralized financing organization;

e) for each user and each centralized financing organization, adding the first stored representative values in order to calculate a first total amount owed by the user to the various network operators through the centralized financing organization; and f) for each operator and each centralized financing organization, adding the representative amounts stored in order to obtain a second total amount owed to the operator concerned by the various network users through the centralized financing organization.

The procedure is also characterized by the fact that the network user purchases from the centralized financing organization at least one toll token representative of monetary units, and by the fact that the first representative value is debited from the toll token purchased by the user.

Operation c) further involves:
carrying out the operations on the data packet if the representative amount is equal to or less than the representative value,
not performing the operations on the data packet if the representative amount is greater than the representative value.

At least the representative value of the monetary unit credit and the representative amount of the reduced representative value are numerical numbers derived from performing authentication functions on the representative value and on the representative amount.

The authentication function may be carried out on the content of the data packet and/or on the identity of the centralized financing organization.

The authentication functions are of the numerical signature type, procedures utilizing hashing functions, or cryptographic procedures.

A non-duplication function may be carried out on the representative value of the monetary unit credit so as to prevent the use of the representative value more than once.

Step a) includes the following intermediate steps:
a1) calculate the representative value based on the cost of the operations to be performed on the data packet in the data-transmission network;
a2) calculate the numerical number by carrying out the authentication function; and
a3) inserting the numerical number in the data packet to be transmitted.

In intermediate step a1), calculation depends on the originating and terminal addresses of the data packet, on the number of communication nodes through which the data packet must travel, and on the operations which the communication nodes will perform and the grades of the operations carried out.

Intermediate step a3) involves:
creating a "toll header" in each data packet, and
set parameters for this "toll header" so as to insert therein the numerical number.

One portion of the toll header may be used to transmit to the operator information which enables it to process the content of the toll header.

The representative values, the representative amounts, and the identities of the centralized financing organizations are authenticated randomly or on a probabilistic basis.

The network user is a network access provider for other users, and the access provider performs the functions of an operator with respect to the other users.

The invention concerns not only the procedure described above, but also a data-processing system serving to implement the procedure.

This data-processing system may be personalized at each node belonging to the network and at each user's site, or it may be integrated into the information management system of each node belonging to the data-transmission network.

What is claimed is:

1. Procedure for determining the components used to bill the cost, to at least one centralized financing organization, of the operations performed by a packet-switched network used to transmit data in datagram data packets, said packet-switched network comprising:
a plurality of communication nodes which carry out said operations by means of one or several operators and serving a plurality of users, wherein said procedure includes the following main steps:

a) assigning to each datagram data packet to be transmitted by a packet-switched network user a first value representing a "toll" monetary unit credit, as well as the identity of the centralized financing organization supplying the credit, the credit amount corresponding to the cost of the operations to be performed on each data packet in the data-transmission packet-switched network using at least one communication node;
b) recording the first representative value and the identity of the centralized financing organization concerned;
c) in at least the communication node, reducing the first representative value by an amount representing the cost of the operations to be performed on the data packet in the node in question;
d) recording the amount representative of the reduced representative value and the identity of the centralized financing organization;
e) for each user and each centralized financing organization, adding the first stored representative values in order to calculate a first total amount owed by the user to the various network operators through the centralized financing organization; and
f) for each operator and each centralized financing organization, adding the representative amounts stored in order to obtain a second total amount owed to the operator concerned by the various network users through the centralized financing organization.

2. Procedure according to claim 1, wherein the network user purchases from the centralized financing organization at least one toll token representing monetary units, and wherein said first represented value is debited on the toll token purchased by the user.

3. Procedure according to claim 1 or 2, wherein operation c) further comprises:
carrying out the operations on the data packet if the representative amount is equal to or less than the representative value;
not performing the operations on the data packet if the representative amount is greater than the representative value.

4. Procedure according to claim 1, wherein at least said value representative of the monetary unit credit and said amount representative of the reduction of said representative value are numerical numbers resulting from the performance of authentication functions on said representative value and on said representative amount.

5. Procedure according to claim 4, wherein the authentication function is applied to the identity of the centralized financing organization.

6. Procedure according to claim 4 or 5, wherein the authentication function is implemented on the content of the data packet.

7. Procedure according to claim 4, or 5, wherein the authentication functions are of the numerical signature type.

8. Procedure according to claim 4, or 5, wherein the authentication functions are procedures utilizing hashing functions.

9. Procedure according to claim 4, or 5, wherein the authentication functions are cryptographic procedures.

10. Procedure according to claim 4, wherein a non-duplication function is implemented on said value representative of the monetary unit credit so as to prevent the use of said representative value more than once.

11. Procedure according to any of claims 4, 5, or 10, wherein step a) includes the following main steps:

a1) calculate the representative value based on the cost of the operations to be performed on the data packet in the data-transmission network;

a2) calculate the numerical number by carrying out the authentication function; and a3) inserting the numerical number in the data packet to be transmitted.

12. Procedure according to claim 11, wherein in the intermediate step a), calculation depends on the originating and terminal addresses of the data packet, on the number of communication nodes through which the data packet must transit, on the types of operations which said communication nodes must perform, and on the grades of the operations performed.

13. Procedure according to claim 12, wherein the intermediate step a3) consists in:

creating a "toll header" in each data packet, and setting the parameters of this "toll header" so as to insert therein the numerical number.

14. Procedure according to claim 13, wherein a portion of the toll header is used to transmit to the operator information which enables it to process the content of the toll header.

15. Procedure according to any of claims 4, 5, or 10, wherein the representative values, the representative amounts, and the identities of the centralized financing organizations are authenticated randomly or on a probabilistic basis.

16. Procedure according to any of the preceding claims 1, 2, 4, 5 or 10, wherein the network user is a network access provider for other users, and wherein said access provider performs the functions of an operator for the other users.

17. Procedure according to claims 1, 2, 4, 5, or 10, wherein a data processing system is used to implement the invention.

18. System according to claim 17, wherein said data-processing system is personalized at each node belonging to the network and at each user's site.

19. System according to claim 17, wherein said data-processing system is integrated into the information management system of each node belonging to the data-transmission network.

20. A method for determining components used to bill costs to a centralized financing organization, for operations performed on an Internet packet-switched network wherein data is transmitted in datagram data packets, in accordance with an IP protocol, from Internet service providers to the Internet network, the network including a plurality of communication nodes carrying out operations by a plurality of network operators that control segments of the Internet network, the method comprising the steps:

a) assigning to each datagram data packet, to be transmitted by an Internet service provider, a first value representing a toll monetary unit credit, as well as the identity of the centralized financing organization supplying the credit, the credit amount corresponding to the cost of the operations to be performed on each data packet in the packet-switched network using the nodes;

b) recording the first representative value and the identity of the centralized financing organization concerned;

c) reducing the first representative value by an amount representing the cost of the operations to be performed on the data packet in corresponding node;

d) recording the reduced representative value and the identity of the centralized financing organization;

e) for each Internet service provider and each centralized financing organization, adding the first stored representative values in order to calculate a first total amount owed by the Internet service provider to the various network operators through the centralized financing organization; and f) for each operator and each centralized financing organization, adding the representative amounts stored in order to obtain a second total amount owed to the operator concerned by the Internet service providers through the centralized financing organization.

21. The method set forth in claim 20 wherein the cost of operations to be performed includes calculations of at least one of the following: originating and terminal addresses of the data packet, the number of communication nodes through which the packet passes, the type of operations to be performed by the nodes, and the grades of operations performed.

* * * * *